(12) United States Patent
Hasegawa et al.

(10) Patent No.: US 6,668,968 B2
(45) Date of Patent: Dec. 30, 2003

(54) POWER STEERING SYSTEM

(75) Inventors: Yosuke Hasegawa, Saitama (JP); Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 09/963,370

(22) Filed: Sep. 27, 2001

(65) Prior Publication Data

US 2002/0040824 A1 Apr. 11, 2002

(30) Foreign Application Priority Data

Sep. 29, 2000 (JP) ........................................ 2000-301439
Jun. 14, 2001 (JP) ........................................ 2001-180484

(51) Int. Cl.⁷ ............................................... B62D 5/06
(52) U.S. Cl. ........................................ 180/426; 180/417
(58) Field of Search ................................. 180/417, 426, 180/434; 280/779; 74/388 PS

(56) References Cited

U.S. PATENT DOCUMENTS 3,923,409 A * 12/1975 Stoner ........................ 403/290
4,216,842 A * 8/1980 Decouzon ................... 180/426
4,899,611 A * 2/1990 Pinna ......................... 180/400
5,018,899 A * 5/1991 Kuribara ..................... 403/57
5,076,383 A * 12/1991 Inoue ......................... 180/417
5,253,730 A * 10/1993 Hayashi et al. ............. 180/417
5,580,184 A * 12/1996 Riccitelli .................... 280/779
6,022,047 A * 2/2000 Okubo ....................... 280/779
6,279,953 B1 * 8/2001 Cartwright .................. 280/779

* cited by examiner

Primary Examiner—Daniel G. DePumpo
(74) Attorney, Agent, or Firm—Birch, Stewart, Kolasch & Birch, LLP

(57) ABSTRACT

A power steering system is provided which makes it possible to simplify assembly onto a vehicle body and to enhance assembly accuracy. A steering shaft is divided into two portions in the axial direction. The lower of the two portions is an input shaft. A connecting cylinder to which the input shaft is serration-fitted is integrally provided at a lower portion of the steering shaft. A side wall of the connecting cylinder is provided with a groove in the axial direction. A fastening device is provided for reducing the diameter of the connecting cylinder so as to reduce the width of the groove. A spool lever is integrally fitted to the input shaft.

9 Claims, 3 Drawing Sheets

POWER STEERING SYSTEM

BACKGROUND OF THE INVENTION

1. Field of the Invention

The present invention relates to a power steering system for a vehicle.

2. Description of the Background Art

A known power steering system is shown in FIG. 3, and comprises a power assist cylinder 3 provided between a steering shaft 1 and a vehicle body frame 2, a control valve 4 operated by the steering shaft 1 to control the power assist cylinder 3, an oil pump 5 for pressurizing a working oil supplied to the power assist cylinder 3, and an oil tank 6 for reserving the working oil. The oil tank 6 is an open-to-atmosphere type, and is fitted to the vehicle body frame 2.

The oil pump 5, the oil tank 6 and the control valve 4 are communicated with each other by three oil pipes 7. An input shaft 8 is fixed to a lower end portion of the steering shaft 1 by welding, and a spool lever 9 for operating the control valve 4 is fastened and fixed to the steering shaft 1 through a clamp member 9b. An output shaft 9a to which the power assist cylinder 3 is connected is connected to the input shaft 8.

In the background art as above-mentioned, the input shaft 8 is fixed to a lower end portion of the steering shaft 1 by welding. The output shaft 9a to which the power assist cylinder 3 is connected is connected to the input shaft 8, so that a power assist portion including the power assist cylinder 3 and the control valve 4 and a steering shaft portion including the output shaft must be separately assembled onto a vehicle body, and there is the problem that much time is required for assembly.

In addition, since the spool lever 9 for operating the control valve 4 is fastened and fixed to the steering shaft 1 through a clamp member 9b, the condition of fastening has an influence on assembly accuracy.

SUMMARY OF THE INVENTION

The present invention has been made in consideration of the above-mentioned problems in the background art, and it is an object of the present invention to provide a power steering system with which it is possible to simplify the assembly onto a vehicle body and to enhance assembly accuracy.

In order to attain the above object, the power steering system of the present invention comprises a steering shaft turnably fitted to a vehicle body frame, a power assist cylinder provided between the steering shaft and the vehicle body frame, a control valve operated by the steering shaft to control the power assist cylinder, and a spool lever fitted to the steering shaft for operating the control valve. The power steering system is characterized in that the steering shaft is divided into two portions in the axial direction to set the lower portion to be an input shaft, and a connecting cylinder to which the input shaft is spline-fitted is integrally provided at a lower portion of the steering shaft. A side wall of the connecting cylinder is provided with a groove in the axial direction, and a fastening means is provided for reducing the diameter of the connecting cylinder so as to reduce the width of the groove. The spool lever is integrally fitted to the input shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
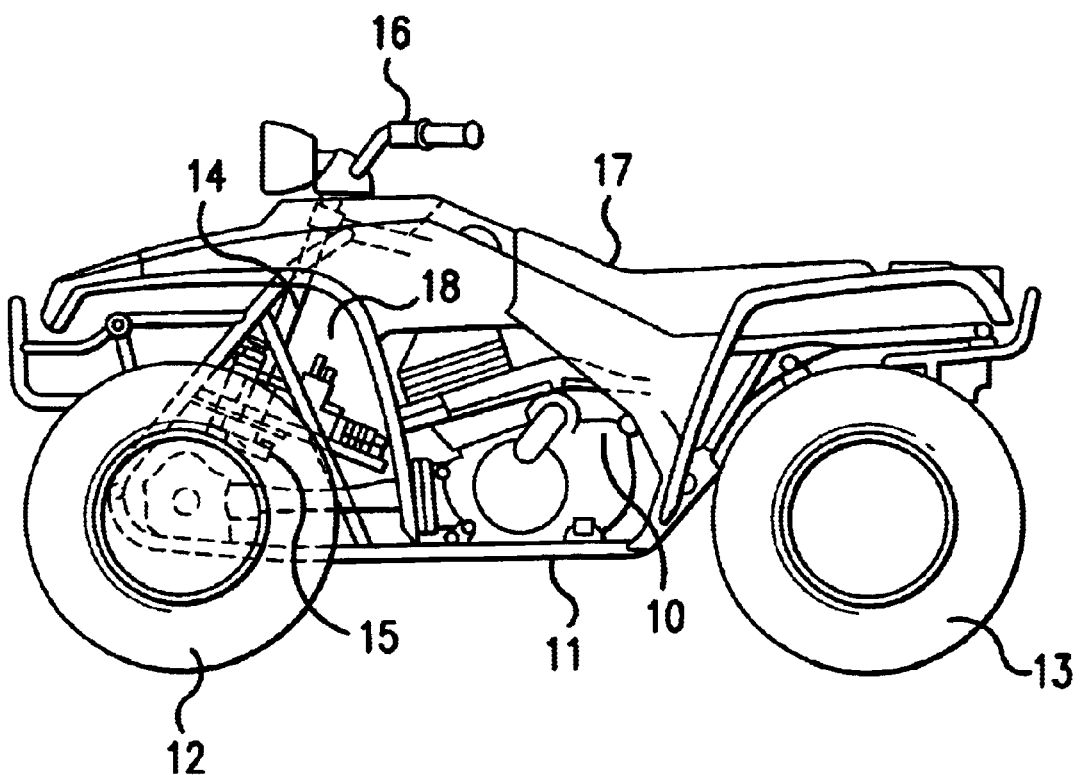
FIG. 1 is a side view of a vehicle for running on a rough ground to which one embodiment of the present invention has been applied.

An embodiment of the present invention will now be described in detail below with reference to the drawings. FIG. 1 shows a saddle-type vehicle as an example of a vehicle to which the present embodiment has been applied. The vehicle comprises a pair of front wheels 12 and rear wheels 13 supported in the front-rear and left-right directions of a vehicle body frame 11. An engine 10 is mounted on a central portion of the vehicle body frame 11. A steering shaft 14 is turnably fitted to a front portion of the vehicle body frame 2. A steering arm 15 connects the front wheels 12 to the steering shaft 14. A steering handle 16 fitted to an upper portion of the steering shaft 14. A seat 17 is fitted to the vehicle body frame 11 at a position on the rear side of the steering handle 16.

A power steering system 18 according to the present embodiment is provided between the vicinity of a lower portion of the steering shaft 14 and the vehicle body frame 11. A connecting cylinder 19 provided with a serration 19a on the inside thereof is integrally fitted to a lower end portion of the steering shaft 14. A side wall of the connecting cylinder 19 is provided with a groove 19b reaching to the lower end edge of the side wall. Flanges 20 are projected on both sides of the groove 19b. A fastening bolt 21 is provided which penetrates through the flanges 20. The spacing between the flanges 20 is reduced by the fastening bolt 21 and a nut 22 mated with the fastening bolt 21, whereby the inside diameter of the connecting cylinder 19 can be reduced.

An input shaft 23 is inserted into the connecting cylinder 19 from the lower end portion, and is meshed with the serration 19a so that relative rotation around an axis is inhibited, and is integrated with the connecting cylinder 19 by a reduction in the diameter of the connecting cylinder 19. In addition, a spool lever 25 for operating a control valve 24 constituting the power steering system 18 described later is integrally fitted to the input shaft 23 at a position on the lower side of the connecting cylinder 19 by welding.

Figure 2A:
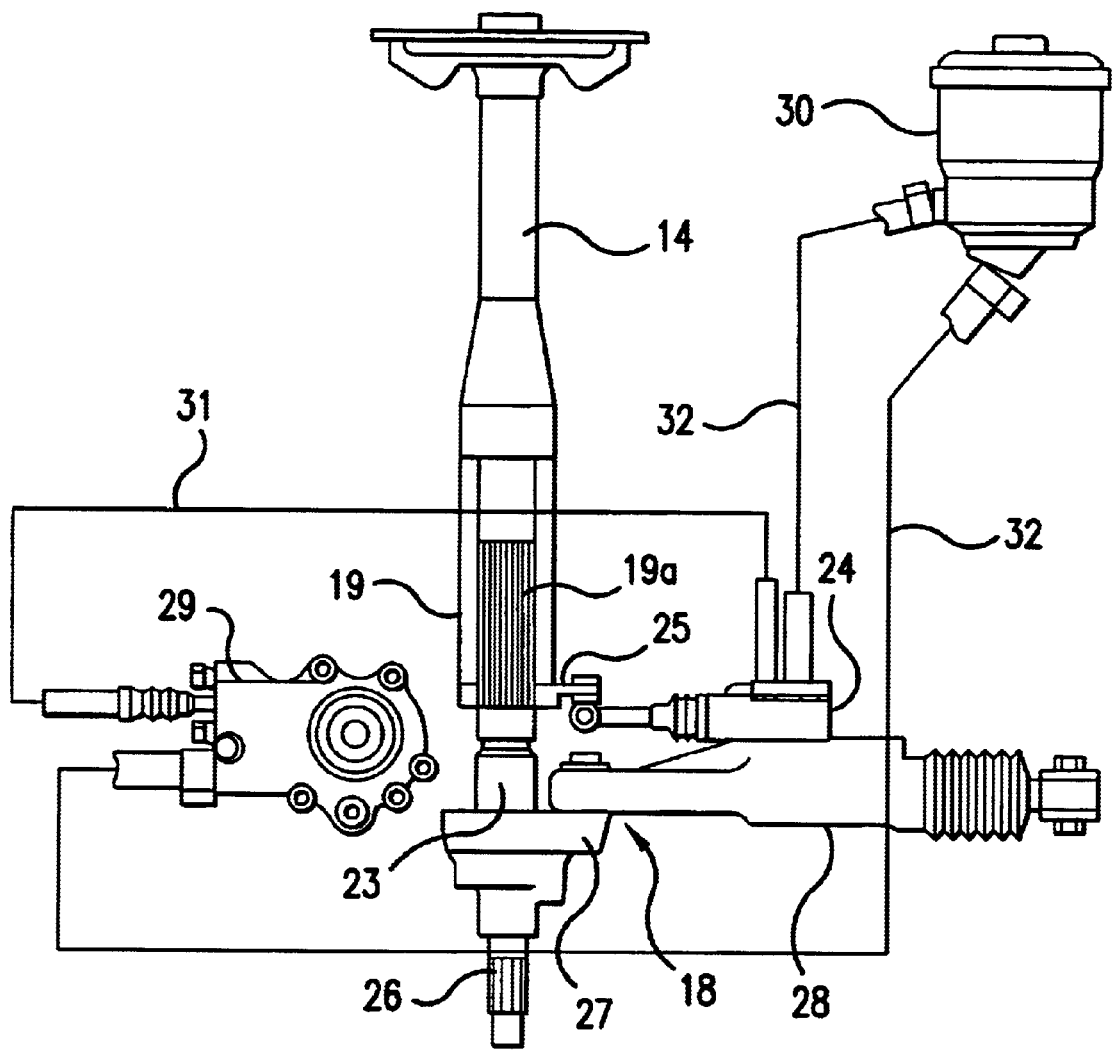
FIG. 2A is a system constitution diagram of one embodiment of the present invention.
Figure 2B:
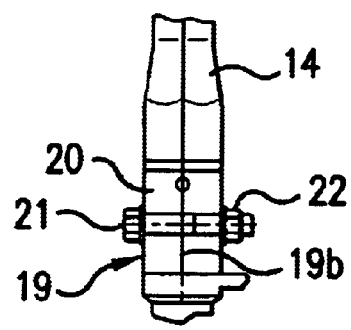
FIG. 2B is an enlarged view of a portion of the embodiment of the present invention.
Figure 3:
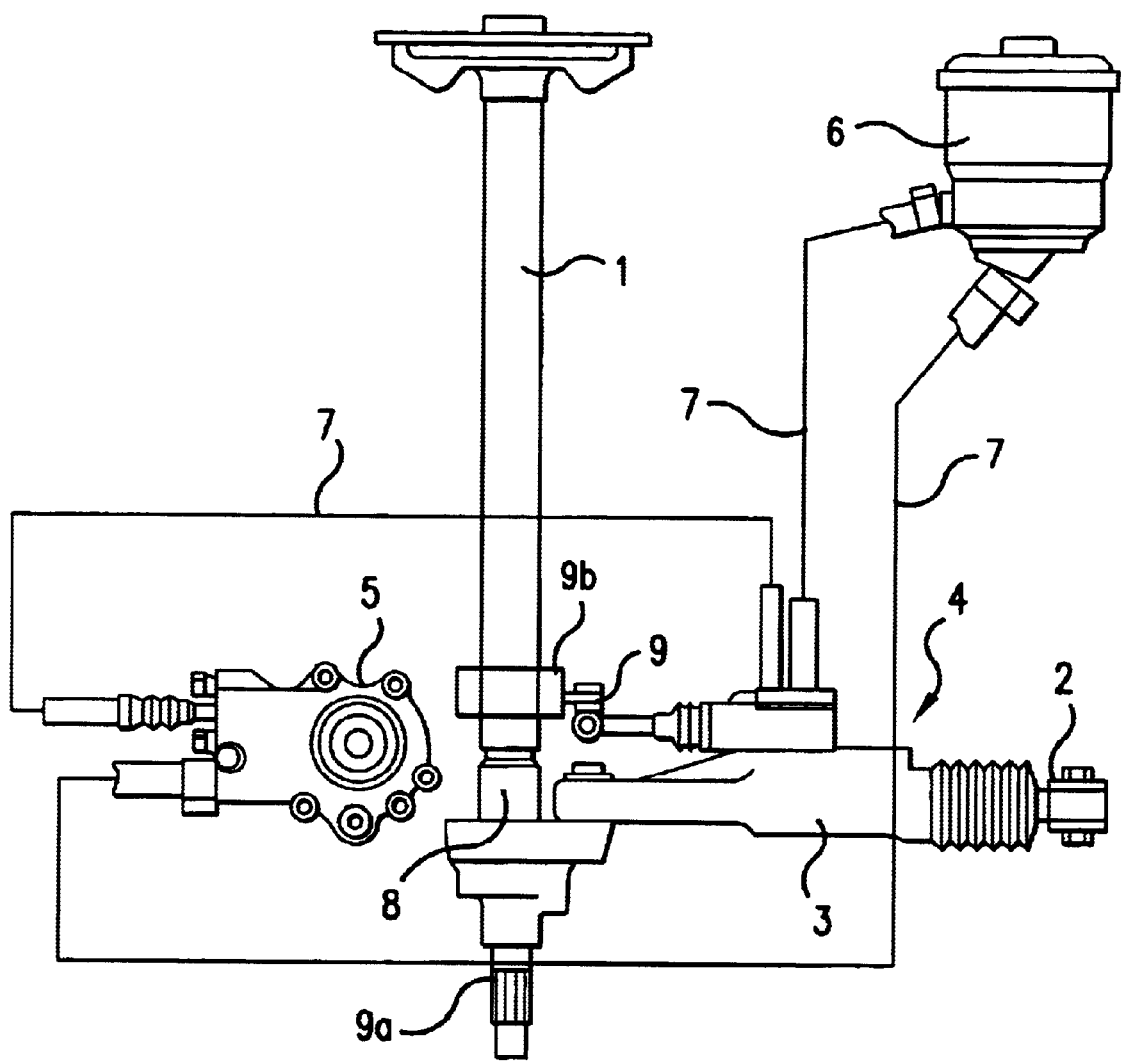
FIG. 3 is a system constitution diagram of a background art example.

Further, as shown in FIG. 2A, the power steering system 18 comprises an output shaft 26 provided axially adjacent to a lower portion of the input shaft 23, and a center arm 27 provided so as to project in the radial direction of the output shaft 26. A power assist cylinder 28 is intermediately disposed between the center arm 27 and the vehicle body frame 11. The control valve 24 is fitted to the power assist cylinder 28 to control the power assist cylinder 28. An oil pump 29 is fitted to the engine 10 for supplying a pressurized working oil to the control valve 24. An oil tank 30 is provided for reserving the working oil.

The oil pump 29 and the control valve 24 are communicated with each other by a working oil supply pipe 31 for supplying the working oil pressurized by the oil pump 29 to the control valve 24, and a working oil return pipe 32 for returning the working oil from the control valve 24 to the oil pump 29 through the oil tank 30.

In the power steering system 18 according to the present embodiment constituted as above, when the steering handle 16 is operated to the left or right, the spool lever 25 fitted to the steering handle 16 is oscillated, the control valve 24 is operated, the working oil supplied from the oil pump 29 is supplied to the power assist cylinder 28, and a turning force in the operating direction of the steering handle 16 is given to the output shaft 26 through the center arm 27. By this, the operating force on the steering handle 16 is alleviated.

In the present embodiment, the input shaft 23 is fastened and fixed to the steering shaft 14 through the connecting cylinder 19 in the condition where relative turning is inhibited by the serration 19a, and the spool lever 25 is integrally fitted to the input shaft 23. Therefore, at the time of assembly onto the vehicle body, the power assist portion including the input shaft 23, the power assist cylinder 28 and the control valve 24 as well as the input shaft 23 and the output shaft 26 are preliminarily assembled, and then the connecting cylinder 19 is fitted and then fastened and fixed to the input shaft 23, whereby the steering shaft 14 with the steering handle 16 fitted thereto can be connected to the input shaft 23. Thus, in the present embodiment, the power steering system 18 can be easily assembled onto the vehicle body.

In addition, with the spool lever 25 integrally fixed to the input shaft 23, there is no possibility that the fitting position of the spool lever 25 may be staggered, and therefore, an enhanced fitting accuracy can be produced. Incidentally, the shape, size and the like of each component member shown in the above embodiment are only presented as examples, and various modifications can be made based on design requirement and the like.

According to the power steering system of the present invention, the input shaft is fastened and fixed to the steering shaft through the connecting cylinder in the condition where relative turning is inhibited by the serration, or splined coupling, and the spool lever is integrally fitted to the input shaft. Therefore, at the time of assembly onto the vehicle body, the power assist portion including the input shaft, the power assist cylinder and the control valve as well as the input shaft and the output shaft are preliminarily assembled, and then the connecting cylinder is fitted and then fastened and fixed to the input shaft, whereby the steering shaft with the steering handle fitted thereto can be connected to the input shaft. By this, the power steering system can be assembled onto the vehicle body through an easy work. In addition, with the spool lever integrally fixed to the input shaft, there is no possibility that the fitting position of the spool lever is staggered, and, therefore, enhanced fitting accuracy can be obtained.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A power steering system comprising:
   a steering shaft turnably fitted to a vehicle body frame;
   a power assist cylinder provided between said steering shaft and said vehicle body frame;
   a control valve operated by said steering shaft to control said power assist cylinder; and
   a spool lever fitted to said steering shaft for operating said control valve, wherein
      said steering shaft is divided in the axial direction into a lower section and an upper section, the lower section being an input shaft,
      a connecting cylinder, to which said input shaft is serration-fitted, is integrally provided at a lower portion of said steering shaft,
      a side wall of said connecting cylinder is provided with a groove in the axial direction,
      fastening means is provided for reducing the diameter of said connecting cylinder so as to reduce the width of said groove, and
      said spool lever is integrally fitted to said input shaft.

2. A power steering system, comprising:
   a steering shaft rotatably fitted to a vehicle body frame, said steering shaft being divided in the axial direction into a lower section and an upper section,
   said lower section comprising an input shaft;
   said upper section comprising a connecting cylinder integrally provided at a lower portion of said steering shaft, said connecting cylinder being serration-fitted to said input shaft;
   a power assist cylinder provided between said steering shaft and the vehicle body frame;
   a control valve operated by said steering shaft to control said power assist cylinder; and
   a spool lever integrally fitted to said input shaft of said steering shaft for operating said control valve.

3. The power steering system according to claim 2, wherein a side wall of said connecting cylinder is provided with a groove in the axial direction.

4. The power steering system according to claim 3, further comprising fastening means for reducing the diameter of said connecting cylinder so as to reduce the width of said groove to thereby secure said connecting cylinder to said input shaft.

5. The power steering system according to claim 4, wherein said fastening means comprises a threaded fastener extending through said connecting cylinder.

6. A power steering system for a vehicle, comprising:
   a frame;
   a steering shaft rotatably fitted to said frame, said steering shaft including a connecting cylinder integrally provided at a lower portion of said steering shaft, said connecting cylinder including a female spline fitting therein;
   an input shaft including a male spline fitting which is received in said female spline fitting of said connecting cylinder;
   a power assist cylinder connected between said frame and said input shaft of said steering shaft; and
   a control valve operated by said steering shaft for controlling said power assist cylinder, wherein said input shaft of said steering shaft includes a spool lever attached thereto for operating said control valve, and wherein said spool lever is integrally fitted to said input shaft as a one-piece unitary member.

7. The power steering system according to claim 6, said connecting cylinder including a groove in a side wall thereof which extends in the axial direction of said connecting cylinder.

8. The power steering system according to claim 7, further comprising a fastener extending through said connecting cylinder for reducing the diameter of said connecting cylinder so as to reduce the width of said groove to thereby secure said connecting cylinder to said input shaft.

9. The power steering system according to claim 8, wherein said fastener is a threaded bolt having a nut threadably engaged therewith.

* * * * *